US006383376B1

(12) United States Patent
Beauchamp (10) Patent No.: US 6,383,376 B1
(45) Date of Patent: May 7, 2002

(54) METHOD AND APPARATUS FOR FILTERING A LIQUID

(75) Inventor: Pierre Beauchamp, 270 Lalonde Street, Valleyfield, Quebec (CA), J7T 5L4

(73) Assignees: Pierre Beauchamp, Valleyfield; Plasti-Drain Ltée, St-Clet, both of (CA)

( * ) Notice: Subject to any disclaimer, the term of this patent is extended or adjusted under 35 U.S.C. 154(b) by 0 days.

(21) Appl. No.: 09/452,816

(22) Filed: Dec. 1, 1999

(30) Foreign Application Priority Data

Jan. 21, 1999 (CA) ............................................. 2260178

(51) Int. Cl.[7] .......................... B01D 24/26; B01D 24/46
(52) U.S. Cl. ....................... 210/189; 210/284; 210/274; 210/275; 210/268
(58) Field of Search ................................ 210/284, 253, 210/189, 274, 268, 275

(56) References Cited

U.S. PATENT DOCUMENTS

| 3,814,247 A | 6/1974 | Hirs |
| 3,953,333 A | 4/1976 | Hirs |
| 4,126,546 A | 11/1978 | Hjelmnér et al. |
| 4,246,102 A | 1/1981 | Hjelmner et al. |
| 4,627,923 A | 12/1986 | Ross |
| 4,885,083 A | 12/1989 | Banks |
| 5,080,808 A | 1/1992 | Kim et al. |
| 5,112,504 A | * 5/1992 | Johnson |
| 5,277,829 A | * 1/1994 | Ward |
| 5,520,804 A | * 5/1996 | Ward |
| 5,573,671 A | * 11/1996 | Klein |
| 5,681,472 A | * 10/1997 | Jönsson et al. |
| 5,770,080 A | 6/1998 | Malone |

* cited by examiner

Primary Examiner—Thomas M. Lithgow
(74) Attorney, Agent, or Firm—Swabey Ogilvy Renault; Robert Mitchell (57) ABSTRACT

A filter comprises a main tank and at least two separate beds of particulate filter media contained in respective conical recipients integrated within the main tank so as to minimize the overall height and weight of the filter. A transport pipe is provided for each conical recipient in order to transport dirty filter media therefrom to a washing device in which the dirty filter media is washed as it flows downwardly in counter-current with a wash liquid. A filter media return pipe is provided for each conical recipient in order to return the cleaned filter media therein. The provision of multiple transport pipes and return pipes ensures efficient distribution of the filter media within the filter.

20 Claims, 10 Drawing Sheets

METHOD AND APPARATUS FOR FILTERING A LIQUID

BACKGROUND OF THE INVENTION

1. Field of the Invention

The present invention relates to the treatment of liquids and, more particularly, pertains to a method and apparatus for filtering liquids.

2. Description of the Prior Art

It is well known to filtrate a liquid by supplying the same to a bed of particulate filter media contained in a tank having a truncated conical bottom end portion configured to prevent the formation of stagnant or dead zones within the bed of particulate filter media. For instance, U.S. Pat. No. 4,126,546 issued on Nov. 21, 1978 to Hjelmner et al. discloses a sand filter comprising a main tank having a funnel-like shape bottom portion. The geometry of the main tank results in the filter being relatively tall which presents a number of disadvantages. The liquid to be filtered is delivered along a vertical direction into the sand and passed gradually upwardly therethrough to form a pool of filtrated liquid above the top surface of the bed of sand. Deflectors must be provided to prevent particles of sand to come in direct contact with the outlet end of each delivery pipe used to supply the liquid to be treated. A single central transport device is provided to continuously convey dirty particles of sand from the bottom of the tank to a washing device immersed in the pool of filtrated liquid. The dirty particles flows downwardly through a single annular wash path defined in the washing device in counter-current with a wash liquid before being recycle onto the top of the filter bed. A deflector is provided underneath the washing device to distribute the cleaned particles of sand on the top surface of the filter bed.

Although the sand filter described in the above mentioned patent is effective, it has been found that there is a need for a more compact and lightweight filter which is adapted to provide an improved distribution of a particulate filter media.

SUMMARY OF THE INVENTION

It is therefore an aim of the present invention to provide a relatively compact and lightweight filter for filtering a liquid by causing it to flow through particulate filter media.

It is also an aim of the present invention to provide a filter which allows continuous washing of the particulate filter media and effective distribution thereof.

It is a further aim of the present invention to provide an improved washing device for continuously washing dirty particles of filter media.

Therefore, in accordance with the present invention, there is provided a filter for filtering a liquid by causing the same to flow upwardly through a particulate filter media, comprising a main tank, at least two upstanding sub-recipients integrated within the main tank for containing a particulate filter media adapted to filter a liquid seeping therethrough, inlet means for delivering and distributing the liquid to be treated into the sub-recipients, and outlet means disposed above a top surface of the sub-recipients for discharging the liquid as a filtrated liquid. The provision of the sub-recipients allows to reduce the height of the filter.

In accordance with a further general aspect of the present invention there is provided an apparatus for filtering a liquid comprising a main tank, at least two laterally separate beds of particulate filter media contained in respective sub-recipients integrated within the main tank, inlet means for delivering a liquid to be treated into both sub-recipients, and outlet means for discharging the liquid which has seeped through the beds of filter media.

In accordance with a further general aspect of the present invention, there is provided a device for washing particulate filter media contaminated during filtration of a liquid, comprising a hollow body defining a wash path, filter media inlet means for directing a flow of dirty filter media in a downward direction along the wash path, washing fluid inlet means for receiving a flow of wash liquid in counter-current to the filter media along the wash path, and a plurality of axially spaced-apart arrays of agglomeration breaking members distributed along at least a portion of the wash path, each array including a number of side-by-side agglomeration breaking members extending across the wash path.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Now referring to the drawings, and in particular to FIG. 1, an apparatus 10 for filtering a liquid, such as water, will be described. The apparatus 10 of the instant invention is particularly suitable for filtering water before being directed to an aqueduct. However, other applications are contemplated as well.

Figure 6:
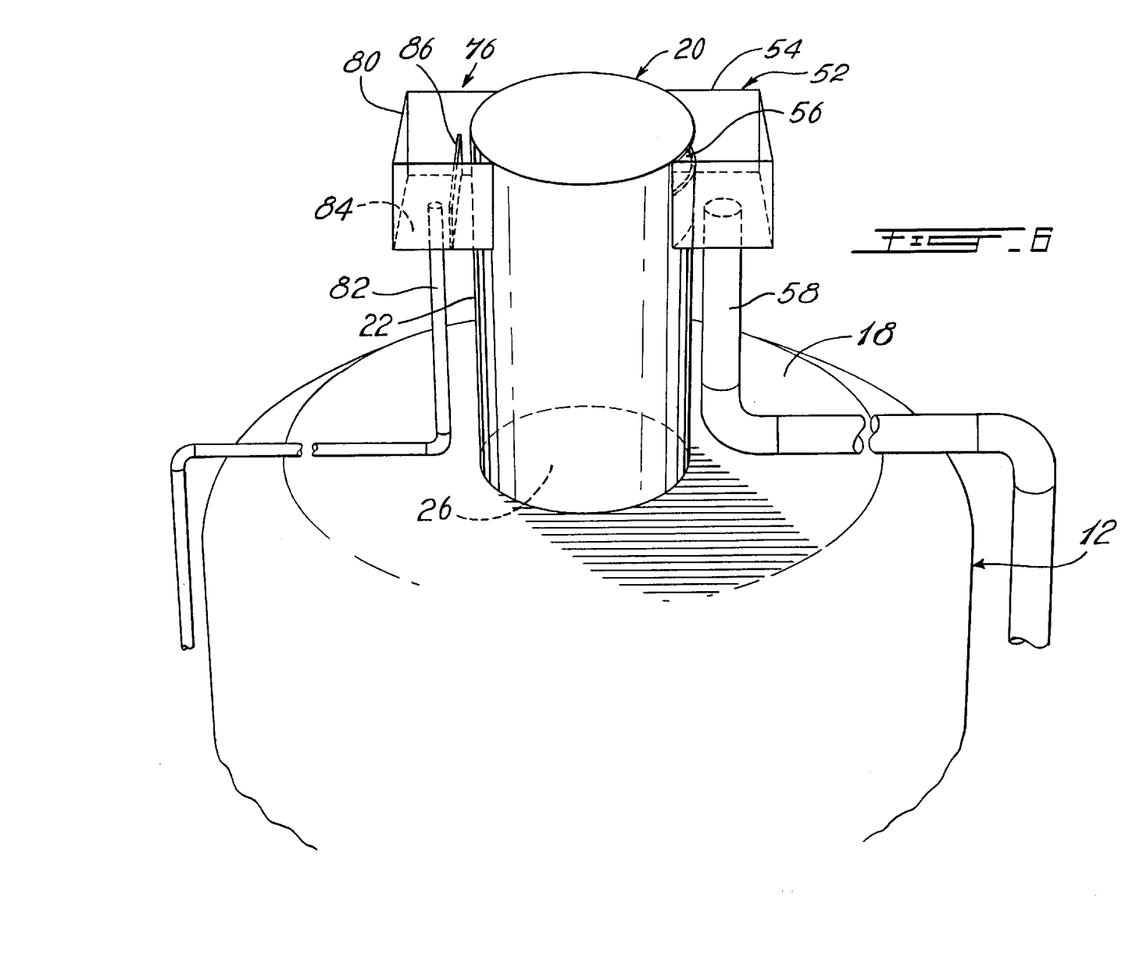
FIG. 6 is a schematic perspective view of a filtered liquid outlet and a waste liquid outlet provided at an upper end of the apparatus of FIG. 1.

The apparatus 10 comprises a main tank 12 having a cylindrical side wall 14, a flat bottom wall 16 and a top wall 18. A secondary tank 20 having a cylindrical side wall 22 and an open bottom end 24 is mounted on the top wall 18 of the main tank 12. As seen in FIG. 6, the main tank 12 and the secondary tank 20 communicate together via a circular opening 26 defined in the top wall 18 of the main tank 12. The main tank 12 and the secondary tank 20 are formed of a thermoplastic material, such as polyethylene. According to a preferred embodiment of the present invention, the secondary tank 20 is welded to the main tank 12. Alternatively, the secondary tank 20 and the main tank 12 could be integrally molded. A lid (not shown) may be disposed on the top open end of the secondary tank 20 to prevent external agents from altering the filtered liquid contained in the secondary tank 20.

Figure 1:
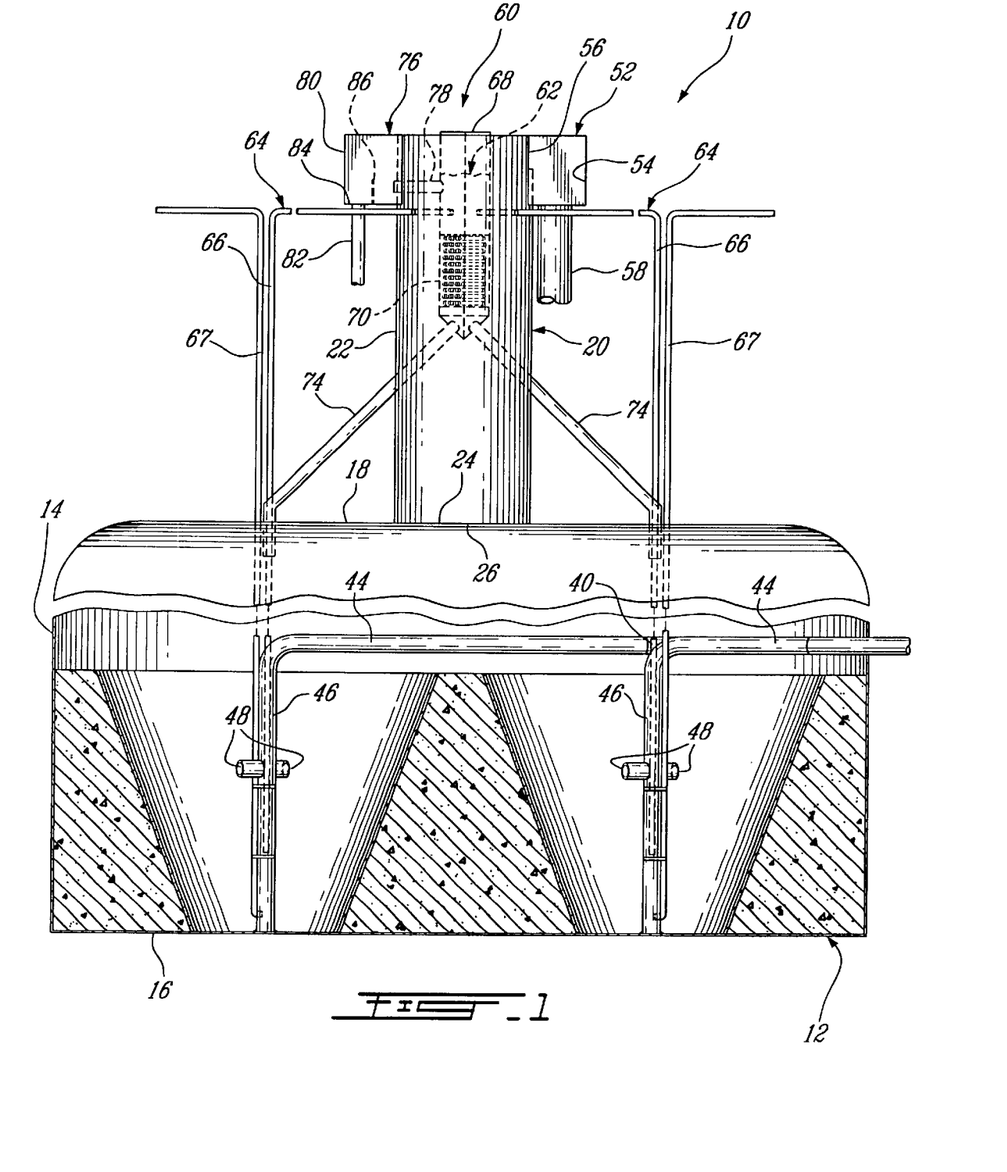
FIG. 1 is a schematic, simplified elevational view of an apparatus for filtering a liquid in accordance with a first embodiment of present invention.
Figure 2:
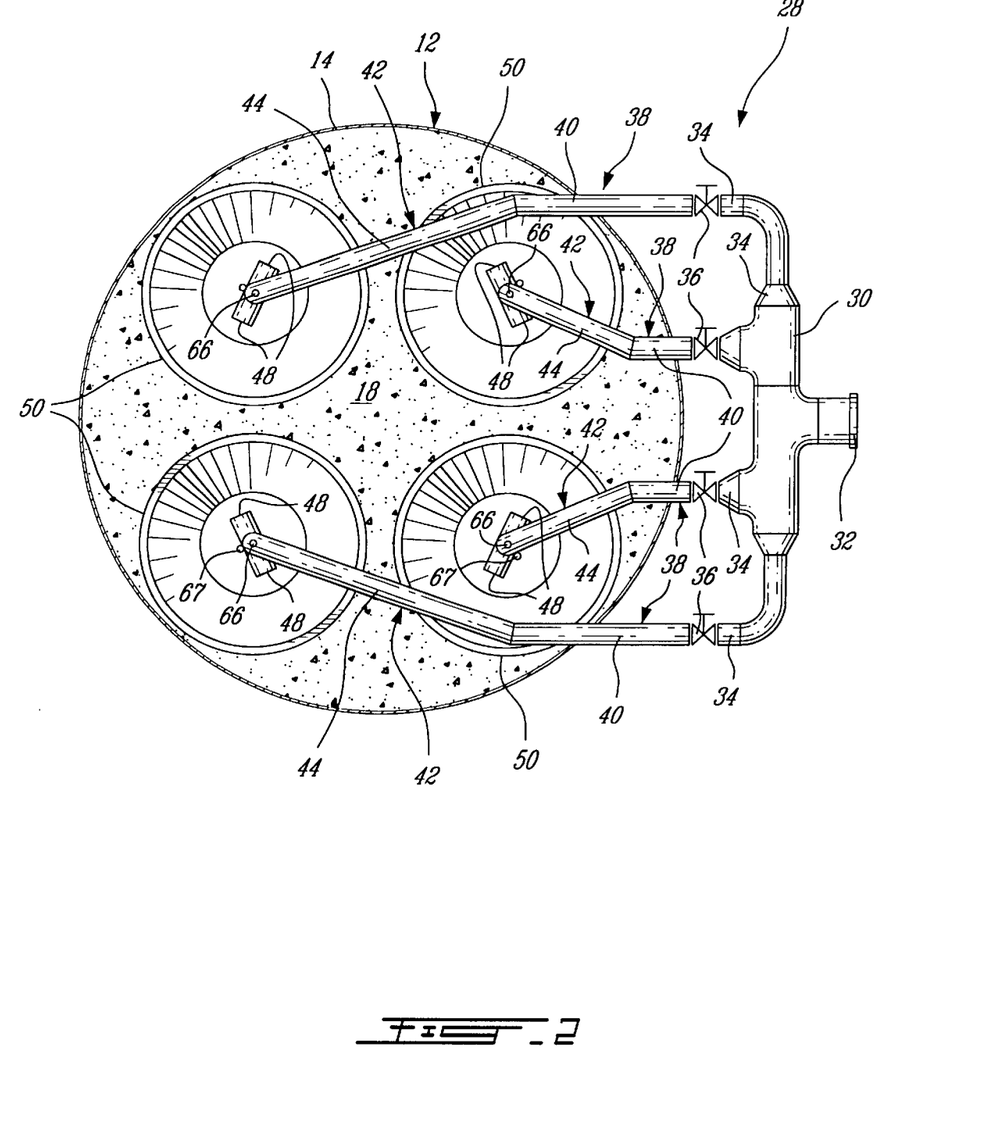
FIG. 2 is a schematic top plan view of a liquid delivery pipe network of the apparatus of FIG. 1.

As seen in FIG. 2, a liquid delivery pipe network 28 is provided for discharging the liquid to be processed into the main tank 12. The liquid delivery pipe network 28 basically includes a manifold 30 having one inlet 32 and four outlets 34, each of which is connected to a valve 36 which in turn is connected to a delivery line 38. The inlet 32 of the manifold 30 is adapted to be connected to a source (not shown) of liquid to be processed. Each delivery line 38 is composed of a linear plastic pipe 40 connected to a curved plastic pipe 42 having consecutive perpendicular portions 44 and 46. As seen in FIG. 1, the distal or bottom end of portion 46 of each curved pipe 42 is welded to the bottom wall 16 of the main tank 12. Each portion 46 is provided with a pair of lateral opposed outlets 48 through which the liquid to be treated is discharged in a horizontal direction. Such a multiple delivery piping system provides improved distribution of the liquid to be filtered, thereby contributing to enhance the overall efficiency of the filtration process.

As seen in FIG. 2, each vertical pipe portion 46 is received in a frusto-conical plastic recipient 50 having its smaller diameter end welded to the bottom wall 16 of the main tank 12. The frusto-conical recipients 50 extend upwardly from the bottom wall 16 above the lateral opposed outlets 48 up to approximately a third of the height of the main tank 12. The inner space of the frusto-conical recipients 50 around the pipe portions 46 is filled with a granular filter media (not shown), such as sand. Accordingly, the lateral opposed outlets 48 through which the liquid to be processed is discharged are buried in the filter media. The provision of such frusto-conical recipients 50 advantageously allows to reduce the overall height of the apparatus 10 by reducing the distance between the bottom of the tank 12 and the top surface of the bed of filter media for a given top surface of filter media. It is understood that the number of frusto-conical recipients varies with the size of the main reservoir 12.

According to a preferred embodiment of the instant invention, concrete is poured within the main tank 12 around the frusto-conical recipients 50 after the apparatus 10 has been shipped and installed at the appropriate location so as to prevent potential entrapment of stagnant water within the main tank 12, which could result in undesirable bacterial growth. According to another embodiment of the present invention, the frusto-conical recipients 50 are integrally molded with the main tank 12 so as to form the bottom wall 16 thereof, thereby eliminating the need of pouring concrete within the main tank 12 in order to fill the space between the frusto-conical recipients 50.

In operation, the liquid to be treated is continuously supply into the filter media through the liquid delivery pipe network 28, thereby forcing the liquid to rise in the filter media through seepage. Eventually, the supplied liquid seeps up out of the granular filter media to form a pool of filtered liquid above the frusto-conical recipients 50 and the concrete. The level of filtered liquid is raised until it reaches the upper end of the secondary tank 20 where the overflow of filtered liquid is collected via a filtered liquid outlet 52.

As seen in FIG. 6, the filtered liquid outlet 52 is essentially composed of a plastic box 54 welded to the outer surface of the cylindrical side wall 22 of the secondary tank 20 for receiving the overflow of filtered liquid passing through an opening 56 defined at the upper end of the cylindrical side wall 22 of the secondary tank 20. The filtered liquid collected by the plastic box 54 is directed to a desired location via an outlet line 58 extending from an undersurface of the box 54.

As seen in FIG. 1, the apparatus 10 further includes a filter media cleaning or washing system 60 adapted to be continuously operated to prevent the filter media from being negatively altered by the liquid to be filtered. In other words, the filter media cleaning system 60 allows the filter media to substantially preserve its original condition, thereby ensuring the overall quality of the filtering process. The filter media cleaning system 60 essentially includes a source (not shown) of pressurized gas, such as air, which is operational to force some liquid and filter media to be displaced upwardly from the frusto-conical recipients 50 to a washing device 62 via four conduits 64 extending from the washing device 62 into respective ones of the frusto-conical recipients 50.

More specifically, each conduit 64 includes a first plastic pipe 67 and a second plastic pipe 66. The plastic pipe 67 of each conduit 64 is connected at an upper end thereof to the source of pressurized gas to convey the gas into the filter media. The pipe 66 of each conduit 64 defines a passage through which may flow the liquid and filter media. As seen in FIG. 1, the lower end portions of the pipes 66 extend into the pipes 46 of the unfiltered liquid delivery lines 38. It is noted that the liquid delivery lines 38 are configured to prevent the liquid to be treated to flow past the outlets 48.

Figures 3, 4:
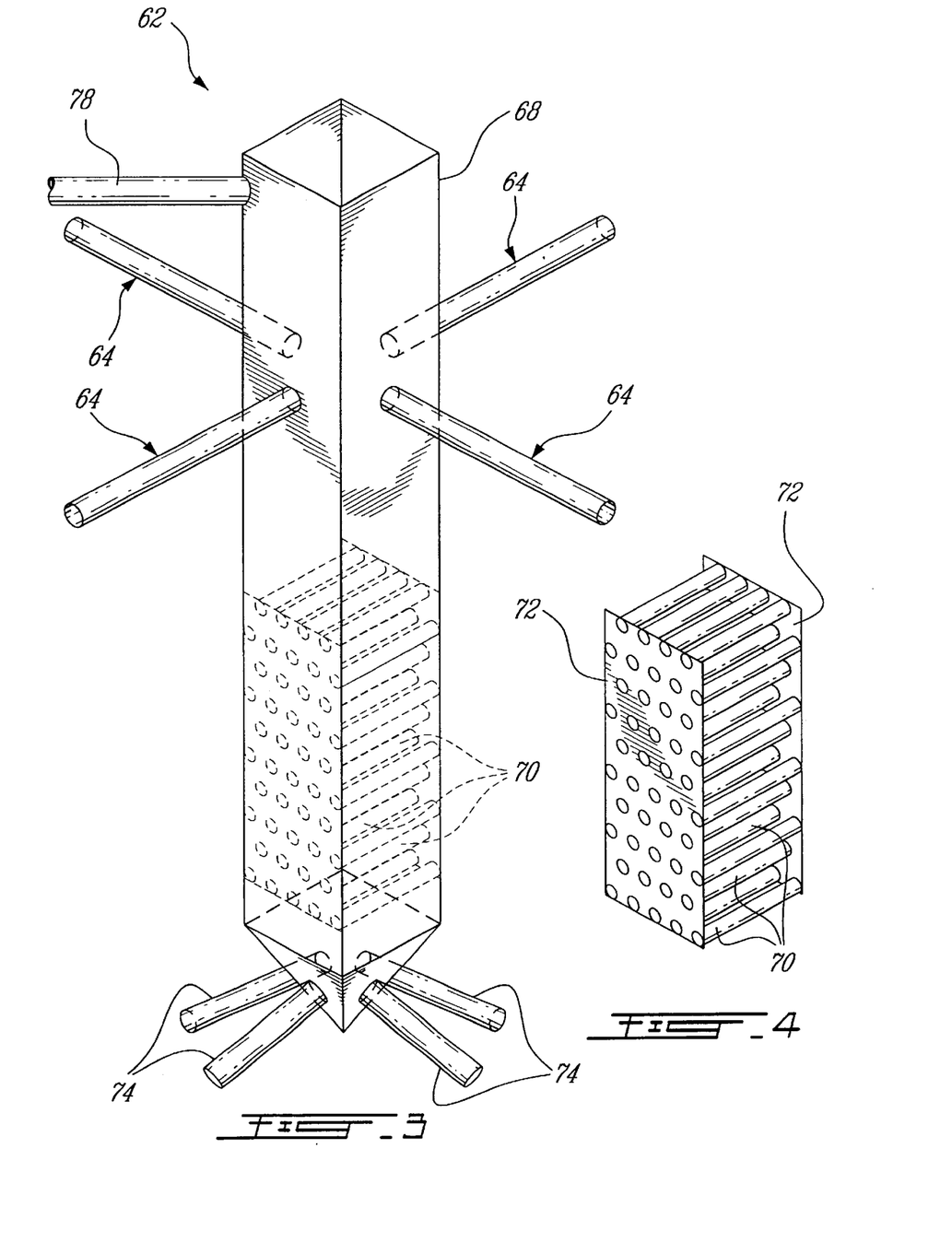
FIG. 3 is a schematic perspective view of a washing device forming part of the apparatus of FIG. 1.
FIG. 4 is a schematic perspective view of the internal structure of the separator of FIG. 3.

As seen in FIGS. 1, 3 and 4, the washing device 62 is disposed outside of the main tank 12 within the secondary tank 20 and includes a container 68 into which the conduits 64 extend for discharging filter media to be washed. A number of vertically spaced-apart arrays of transversally extending elongated members 70 are disposed below the fluid and filter media delivery end of the conduits 64 within the container 68 in order to break up aggregates of filter particles and to create a turbulence in the flow of filter media flowing therethrough by gravity to effect effective separation of the aggregated particles. As seen in FIG. 4, each array of elongated members includes a number of laterally spaced-apart elongated members 70 which are in offset relationship with the elongated members 70 of the adjacent vertically spaced-apart array. According to the first illustrated embodiment of the present invention, successive arrays alternately include four and five elongated members 70. The elongated members 70 are mounted at opposed ends thereof to a pair of support plates 72 which are in turn mounted to the inner surface of the container 68.

Four filter media return pipes 74 extend from the container 68, below the vertically spaced-apart arrays of transversally extending elongated members 70, through the top wall 18 of the main tank 12 for returning the granular or particulate filter media into respective frusto-conical recipients 50. Throughout their passage through the washing device 62, the filter particles encounter clean filtered liquid flowing upwardly through the returns pipes 74 from the immersed bottom ends thereof.

Figure 5:
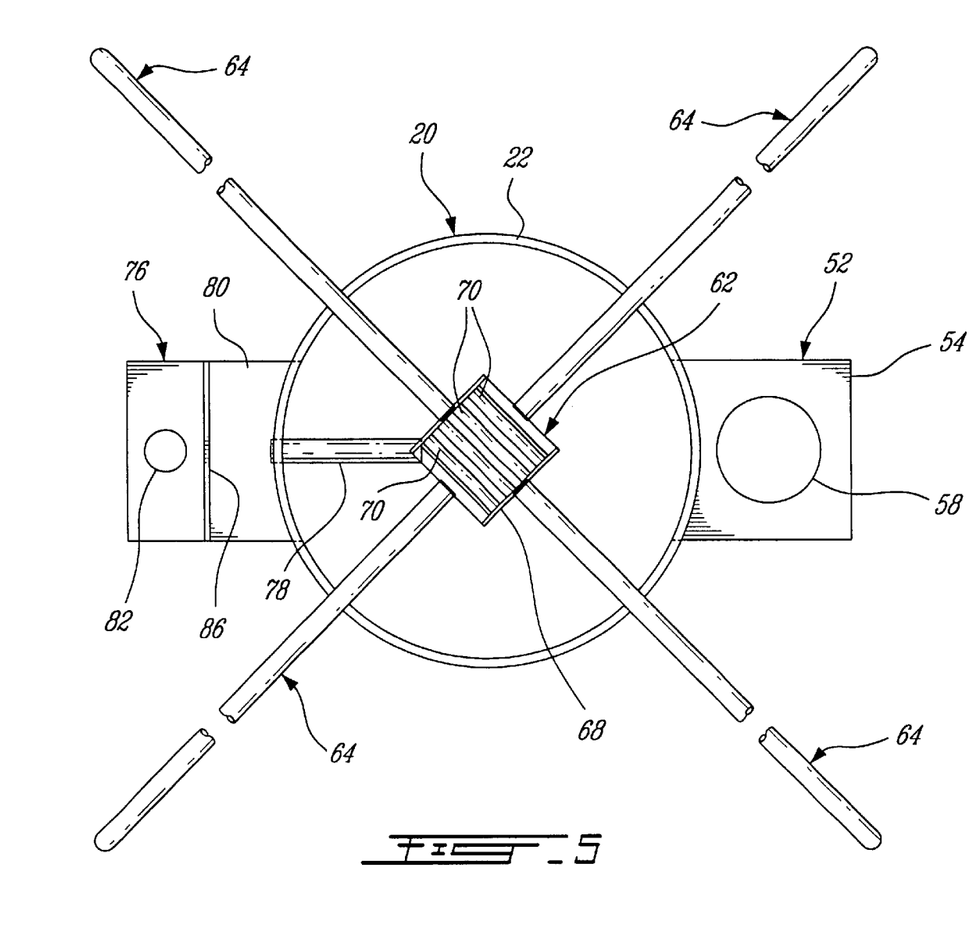
FIG. 5 is a schematic top plan view of the washing device shown in relation with the upper section of the apparatus of FIG. 1.
Figure 7:
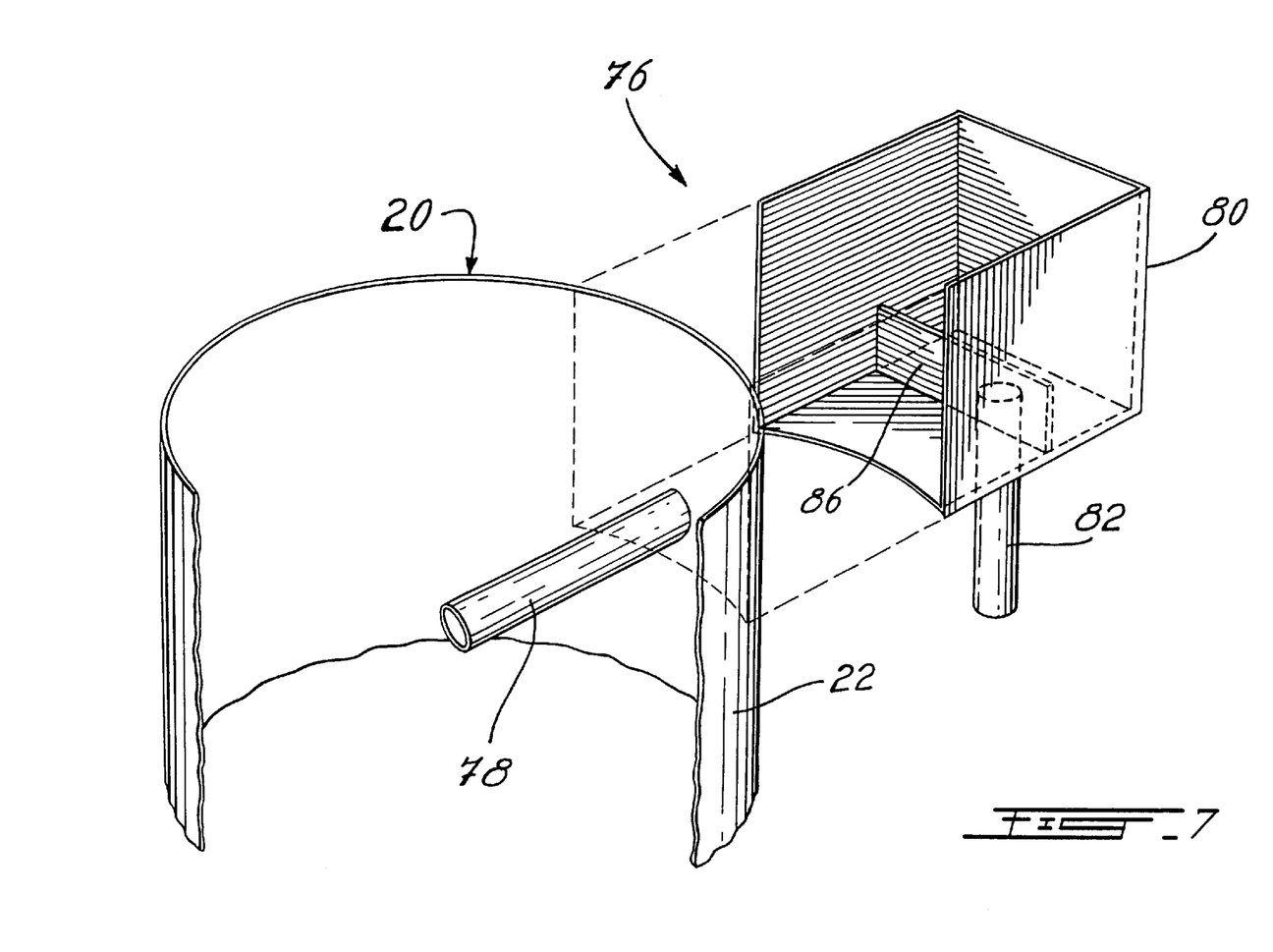
FIG. 7 is a schematic perspective view of the waste liquid outlet.

As seen in FIGS. 1, 5 and 7, a waste liquid outlet 76 is connected to the washing device 62 via a pipe 78 for discharging the liquid which has been directed into the washing device 62.

More specifically, the waste liquid outlet 76 includes a plastic box 80 which is welded to the outer surface of the secondary tank 20 for receiving the waste liquid from the pipe 78, which extends through the cylindrical side wall 22 of the secondary tank 20. The waste or dirty liquid is evacuated from the box 80 through an outlet line 82 formed of a number of end-to-end plastic pipes extending downwardly from the bottom wall 84 of the box 80. A weir 86 extends upwardly from the bottom wall 84 of the box 80 upstream of the pipe 82 at an elevation which is at least equal to the pipe 78 to ensure that the waste fluid will pass from the washing device 62 to the waste liquid outlet 76 at an appropriate flow rate such as to allow the particles of filter media to sink in the washing device 62. Accordingly, the level of liquid within the container 68 and the box 80 will be substantially equal.

In operation, pressurized gas is discharged through the lower end of the pipes 67 of the conduits 64 into the filter media and the liquid contained in the frusto-conical recipients 50, thereby giving rise to the formation of bubbles. As the pressure within the passage defined by the outer pipe 66 of each conduit 64 is less than the pressure within the main tank 12, the bubbles escape through the passage of each conduit 64 bringing with them some filter media particles. Therefore, it can be said that the bubbles have a lifting effect on the particles of filter media.

At their exit from the discharged end of the passages of the conduits 64, the bubbles come in contact with the liquid contained in the washing device 62. This results in the bursting of the bubbles, thereby allowing the filter media particles to flow down by gravity. A substantial portion of the liquid lift with the particles of filter media will be discharged through the waste liquid outlet 76 with little portion thereof flowing back into the main container 12 via the return pipes 74. The vertically spaced-apart arrays of transversally extending members 70 will promote turbulence, thereby causing the separation of the filter media particles. Indeed, as the filter particles are heavier they will sink, while the liquid will tend to remain trapped within the container 68 with the overflow being discharge through the waste liquid outlet 76. Accordingly, the particles of filter media will flow back into the frusto-conical recipients 50 via the return pipes 74. The filtered liquid which flows upwardly through the return pipes 74 and into the container 68 is discharged from the washing device 62 via the waste liquid outlet 76. It is understood that the height of weir 86 can be varied to control the quantity of liquid withdrawn from the pool of filtered liquid contained in the main tank 12.

From the above, it can be appreciated that the filter media cleaning system 60 allows to continuously clean the porous filter media even during the filtration of a supplied liquid.

Figure 8:
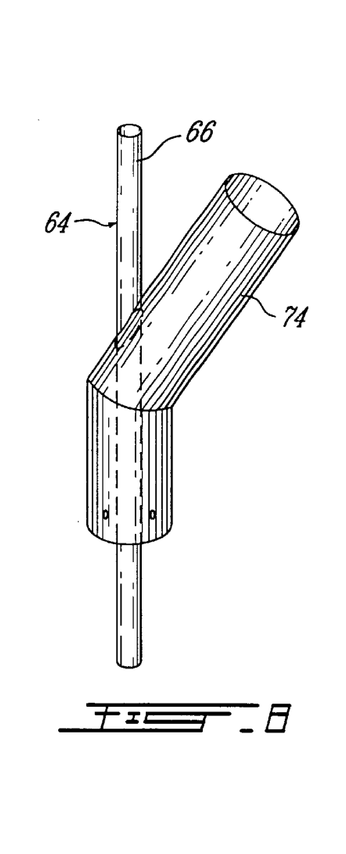
FIG. 8 is a schematic perspective view of an end portion of a filter media return pipe of the washing device of FIG. 3.

As seen in FIGS. 1 and 8, the lower end portion of each return pipe 74 defines a hole for receiving therethrough one of the conduits 64, thereby reducing the number of holes to be defined in the top wall 18 of the main tank 12.

Figure 9:
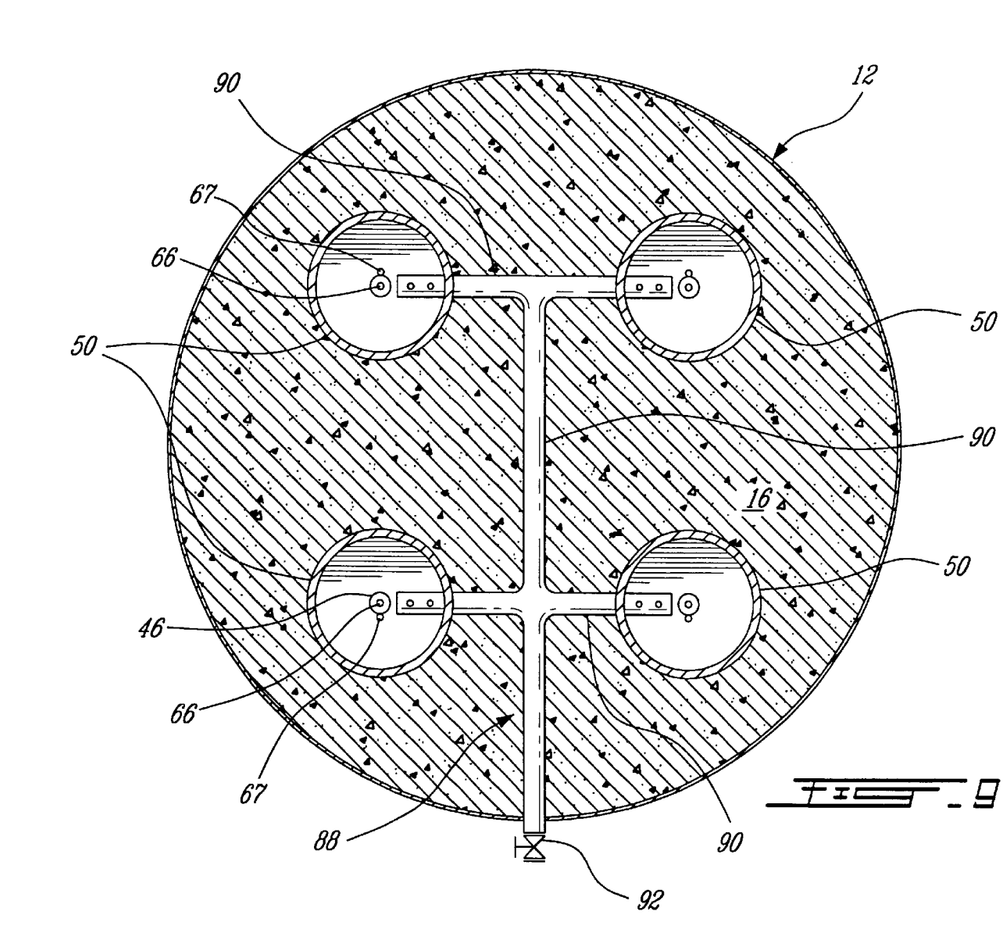
FIG. 9 is a top plan view of a backwash system of the apparatus of FIG. 1.
Figure 10:
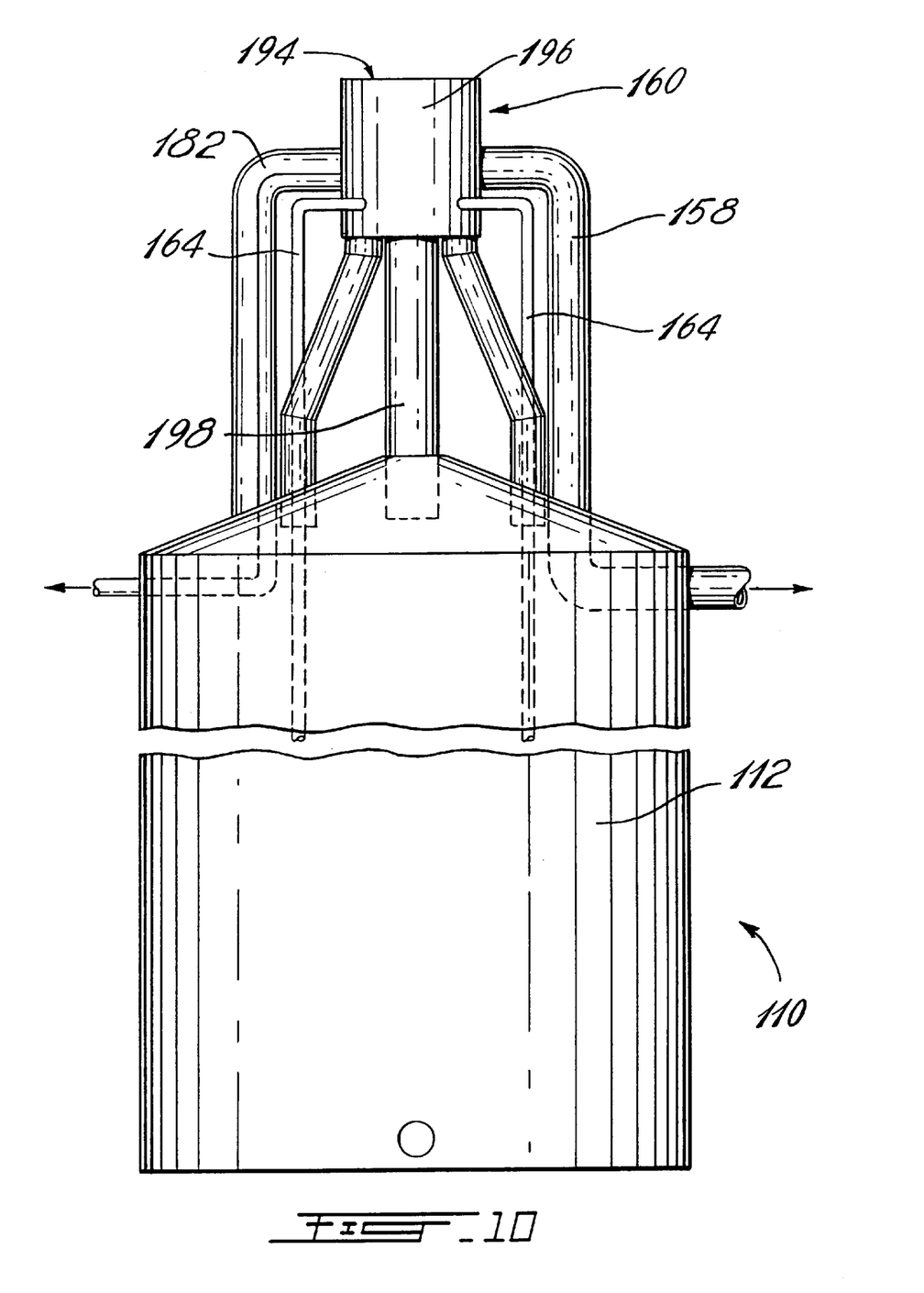
FIG. 10 is a schematic, simplified elevational view of an apparatus for filtering a liquid in accordance with a second embodiment of the present invention.
Figure 11:
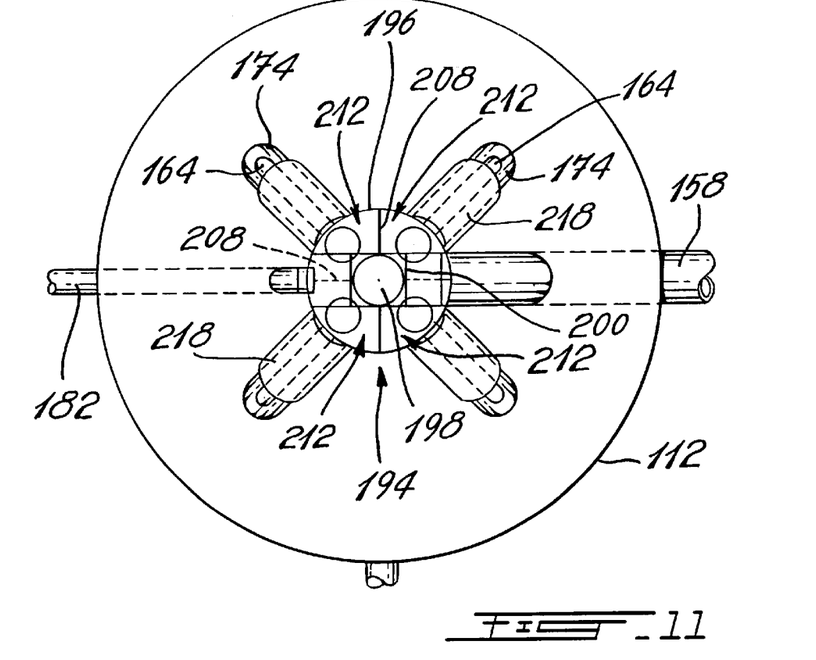
FIG. 11 is a schematic top plan view of the apparatus of FIG. 10, illustrating the disposition of a washing device forming part of the apparatus.

FIG. 9 illustrates a drain system 88 disposed on the bottom wall 16 of the main tank 12. The drain system 88 includes a plurality of perforated drain pipes 90 which extend below the frusto-conical recipients 50 for collecting the liquid and particles to be drained. The drain pipes 90 are connected to a valve 92 for selectively allowing or blocking flow through the perforated drain pipes 90. One advantage of the present invention is that the apparatus 10 does not have to be pre-assembled before being shipped. The apparatus 10 may be readily assembled on site. Moreover, as almost all the principal components of the apparatus 10 are made of thermoplastic, the total weight thereof is considerably inferior to the weight of conventional steel filtering apparatus. The fact that the apparatus 10 is essentially made of thermoplastic, also prevents the same from being subject to corrosion.

FIGS. 10 to 15 illustrate a second filter 110 similar to the first filter 10 but having an alternate washing device 160 mounted outwardly above a main tank 112 of the filter 110. The washing device 160 comprises a distribution box 194 including a cylindrical container 196 connected in flow communication with a zone of filtrated liquid in the main tank 112 via an upstanding pipe 198. The overflow of filtrated liquid is discharged from the main tank 112 via the upstanding pipe 198 as it flows over a weir 200 (see FIG. 12) extending between a pair of parallel partition walls 202 extending in sealing engagement with an inner surface of the cylindrical container 196 to form with two other partition walls 204 and 206 a separate and isolated sub-compartment within the cylindrical container 196. The filtrated liquid flowing over the weir 200 is conveyed to a desired location via an outlet line 158.

Figure 12:
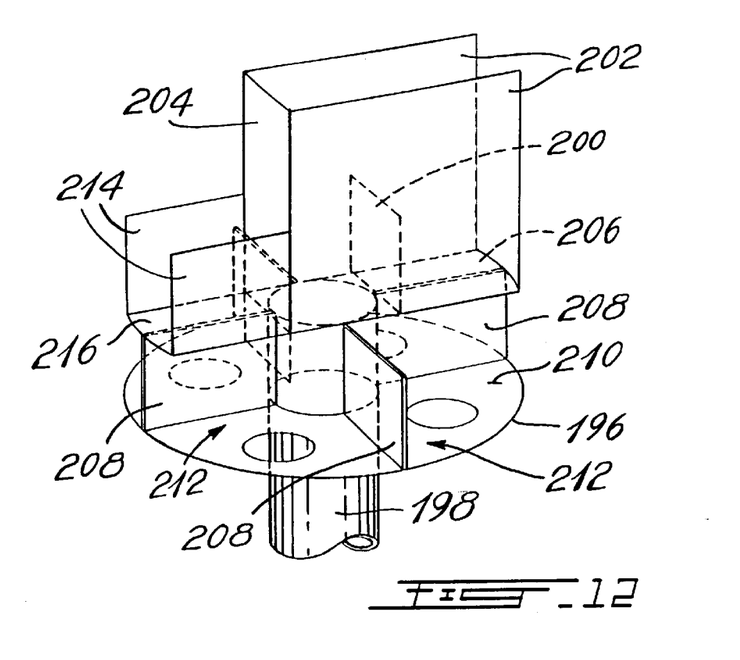
FIG. 12 is a schematic perspective view of the internal structure of a part of the washing device.

According to the illustrated embodiment, the dirty filter media is delivered into the bottom portion of the cylindrical container 196 via four transport pipes 164 having respective upper ends spaced downwardly from the weir 200. As seen in FIG. 12, two pairs of diametrically opposed weirs 208 extends from the bottom wall 210 of the cylindrical tank 196 about an upper portion of the upstanding pipe 198 to divide the bottom portion of the cylindrical container 196 into four equal filter media receiving compartments 212. The dirty filter media is delivered into the filter receiving compartments 212 by the transport pipes and flows downwardly back into the main tank 112 via four return pipes 174 extending downwardly from the bottom wall 210 of the cylindrical container 196. The bottom open end of each return pipe 174 is immersed in the filtrated liquid contained in the main tank 112 and is in vertical alignment with a corresponding conical recipient (not shown) integrated in the bottom of the main tank 112 to contain the particulate filter media, as explained with respect to the first embodiment of the present invention. Throughout their passage through the return pipes 174, the particles of filter media encounters a counter-current flow of filtrated liquid supplied to the washing device 160 through the immersed bottom open ends of the return pipes 174. The filtrated liquid flowing upwardly into the washing device 160 is discharged through an outlet line 182 extending from the cylindrical container 196 at a location spaced downwardly from the weir 200. A pair of parallel weirs 214 extending from a bottom wall 216 between the partition wall 204 and the inner surface of the cylindrical container 196 regulates the flow of filtrated liquid withdrawn from the main tank 112.

Figure 13:
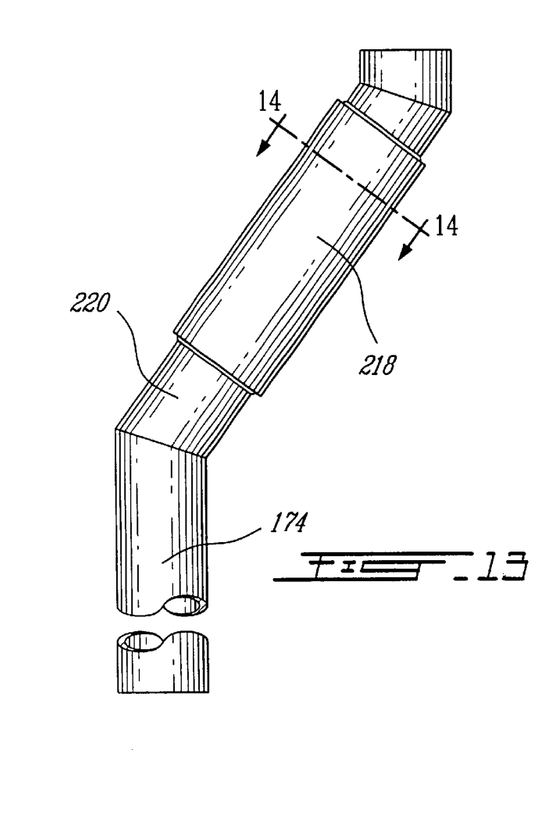
FIG. 13 is an enlarged elevational view of a return pipe of the apparatus of FIG. 10.
Figure 14:
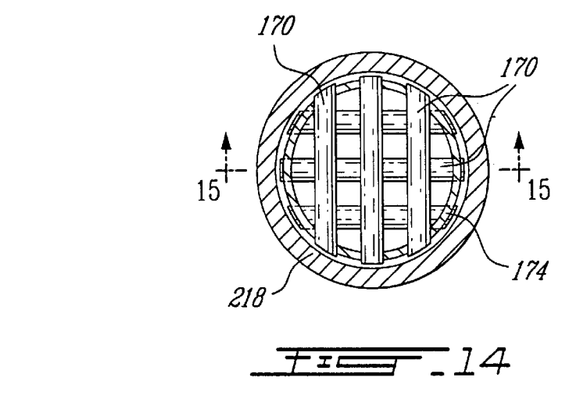
FIG. 14 is a transversal cross-sectional view taken along line 14—14 in FIG. 13.
Figure 15:
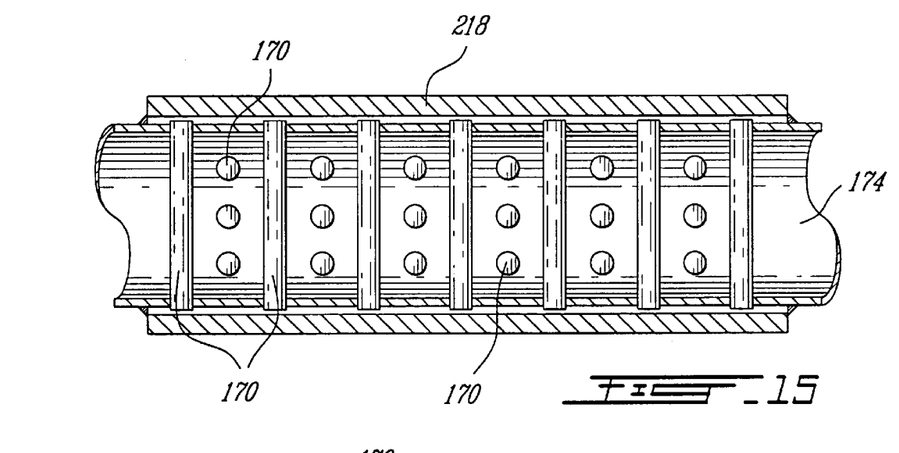
FIG. 15 is a longitudinal cross-sectional view taken along line 15—15 in FIG. 14.

As seen in FIGS. 13 to 15, axially spaced apart arrays of agglomeration breaking members 170 are integrated in each of the return pipes 174. Each array includes a number of laterally spaced-apart agglomeration breaking members 170 extending across the fluid passage defined by the associated return pipe 174. The agglomeration breaking members 170 of adjacent arrays extend at right angles to each others. It has been found that this arrangement provides improved separation of the agglomerated particles of filter media. The agglomeration breaking members 170 are provided in the form of elongated cylinders and are supported at opposed ends thereof in radial bores defined through the associated return pipes 174. A sleeve 218 is mounted on each return pipe 174 to prevent removal of the agglomeration breaking members 170.

As seen in FIG. 13, each set of arrays of agglomerating breaking members 174 is provided in a pipe segment 220 which forms an acute angle with a vertical axis. According to a preferred embodiment of the present invention this angle is about 35 degrees.

What is claimed is:

1. A filter for filtering a liquid by causing the same to flow upwardly through a particulate filter media, comprising a main tank having a central axis, at least two upstanding sub-recipients integrated within said main tank for containing a particulate filter media adapted to filter a liquid seeping therethrough, inlet means for delivering and distributing the liquid to be treated into said sub-recipients, outlet means disposed above a top surface of said sub-recipients for discharging the liquid from said main tank as a filtrated liquid, a transport device comprising at least two transport conduits extending substantially centrally into respective ones of said at least two sub-recipients for directing dirty filter media into a central washing device adapted to wash the dirty filter media as the same passes downwardly therethrough in counter-current with a wash liquid flowing in an upward direction within said washing device, and at least two filter media return pipes extending downwardly at a depending angle from a bottom end of said central washing device for returning cleaned filter media into respective ones of said at least two sub-recipients.

2. A filter as defined in claim 1, wherein said at least two sub-recipients have a funnel-like shape.

3. A filter as defined in claim 1, wherein said at least two sub-recipients flare upwardly from a flat bottom wall of said main tank, and wherein each said sub-recipient consists of a distinct hollow truncated conical member.

4. A filter as defined in claim 2, wherein said sub-recipients have respective top open ends extending in a common horizontal plane, said top open ends being completely surrounded by an intermediate horizontal wall extending inwardly from an inner side wall of said main tank in order to prevent entrapment of liquid and particles of particulate filter media.

5. A filter as defined in claim 4, wherein concrete is poured between said sub-recipients and said inner side wall in order to form said intermediate horizontal wall.

6. A filter as defined in claim 4, wherein said sub-recipients are integrally formed within said intermediate horizontal wall.

7. A filter as defined in claim 1, wherein said washing device includes a washing fluid outlet for discharging dirtied washing fluid.

8. A filter as defined in claim 7, wherein said washing device is located above a top surface of said sub-recipients, and wherein each said filter media return pipe has an opening through which said cleaned filter media is discharged, said opening being immersed in a zone of filtrated liquid located above said top surface of an underlying one of said sub-recipients, said outlet means for discharging filtrated liquid being spaced upwardly from said washing fluid outlet which is, in turn, spaced upwardly from a dirty filter media inlet end of said washing device, whereby filtrated liquid flows upwardly from said zone of filtrated liquid through said opening to said washing fluid outlet.

9. A filter as defined in claim 8, wherein said washing device includes a distribution box in which said outlet means, said dirty filter media inlet end and said washing fluid outlet are defined.

10. A filter as defined in claim 7, wherein said dirty filter media flows along a flow path within said washing device, and wherein said washing device includes a plurality of axially spaced-apart arrays of agglomeration breaking members distributed along at least a portion of said flow path, each said array including a number of side-by-side agglomeration breaking members extending across said flow path.

11. A filter as defined in claim 10, wherein the agglomeration breaking members of adjacent arrays are disposed at right angles with respect to each others.

12. A filter as defined in claim 10, wherein said arrays of agglomeration breaking members are integrated within said filter media return pipes.

13. A filter as defined in claim 10, wherein each said agglomeration breaking member is provided in the form of an elongated cylindrical member.

14. A filter as defined in claim 12, wherein said each of said filter media return pipes extends at 35 degrees from a vertical axis.

15. A filter as defined in claim 7, wherein said washing device is disposed outside and above the main tank.

16. A filter as defined in claim 1, wherein said inlet means include at least two inlet conduits extending into respective one of said at least two sub-recipients for directly delivering the liquid to be treated therein.

17. A filter as defined in claim 16, wherein each of said inlet conduits extends downwardly into a corresponding one of said sub-recipients from an open upper end thereof and is provided at a selected elevation on an upstanding portion thereof with lateral outlet means through which the liquid to be treated can be discharged into the particulate filter media.

18. A filter as defined in claim 17, wherein said lateral outlet means includes a transversal outlet passage extending laterally from diametrically opposed sides of said inlet conduit for delivering the liquid to be treated in a substantially horizontal direction.

19. A filter as defined in claim 18, wherein each of said inlet conduit has a bottom end secured to a bottom wall of said main tank.

20. A filter as defined in claim 8, wherein said filter is molded from a thermoplastic material.

* * * * *